United States Patent [19]
Rao

[11] 3,887,201
[45] June 3, 1975

[54] RUBBING SEAL MATERIAL FOR CERAMIC HEAT EXCHANGER
[75] Inventor: V. Durga Nageswar Rao, Woodhaven, Mich.
[73] Assignee: Ford Motor Company, Dearborn, Mich.
[22] Filed: Nov. 19, 1973
[21] Appl. No.: 417,444

[52] U.S. Cl............... 277/96 R; 277/235 R; 165/9; 106/14
[51] Int. Cl............................................. F28d 19/00
[58] Field of Search........... 165/9; 277/96 R, 235 R; 106/286, 14

[56] References Cited
UNITED STATES PATENTS
3,646,993   3/1972   Rice et al................................ 165/9
3,746,352   7/1973   Rao et al............................. 277/235
3,747,944   7/1973   Roy et al............................ 165/9 X Primary Examiner—Albert W. Davis, Jr.
Attorney, Agent, or Firm—Donald J. Harrington; Keith L. Zerschling

[57] ABSTRACT

A coating for a rubbing seal designed to seal a ceramic matrix for a rotary regenerator in a gas turbine engine, said coating comprising primarily the oxides and halides of calcium and lithium and the sulphates and nitrates of the metals whose oxides are used in the system, whereby the coating adapts the seal system for use in an exhaust gas environment of a gas turbine engine that is relatively free from the oxides of sulfur and nitrogen and the nitrates and sulphates of various other exhaust gas constituents.

12 Claims, 3 Drawing Figures

RUBBING SEAL MATERIAL FOR CERAMIC HEAT EXCHANGER

GENERAL DESCRIPTION OF THE INVENTION

The improved coating of this invention is adapted to be used in those environments that are described in my earlier U.S. Pat. No. 3,746,352. That patent describes a regenerator seal having a surface layer, an intermediate layer and a bonding layer, the latter being situated between a metal substrate and the intermediate layer. The surface layer is adapted to engage with rubbing contact a ceramic surface for a rotary regenerator in a gas turbine engine. The nitrates and sulphates of the elements that are constituents of exhaust gases in a gas turbine engine when the gas turbine engine burns diesel fuel inhibit oxidation of the metals in the regenerator seal surface. If the engine is operating with natural gas fuels, however, those nitrates and sulphates are not available, at least not in sufficient quantity to provide this inhibiting action. The improvements of my invention make it possible to increase the wear characteristics of a rotary regenerator seal of the type shown in my U.S. Pat. No. 3,746,352 by preventing or retarding oxidation of the metallic constituents of the seal thereby increasing the operating life of the gas turbine engine substantially, even when natural gas or alcohol fuels are used. By using the improved seal of my invention when the engine is used with natural gas fuels and alcohols, the wear rate might be maintained at a relatively low value such as one-half micron per 100 operating hours. In contrast, the wear rate might be ten times that amount if an attempt were made to use a seal coating containing the percentages of metal indicated in my earlier U.S. Pat. No. 3,746,352 together with appropriate parts of sodium fluoride and lithium fluoride, the latter two constituents serving as a glazing material.

The presence of water vapor, which is a source of oxygen, is a characteristic of the exhaust gas products when the gas turbine fuel is natural gas or alcohol or the like. Water vapor and the free oxygen that is associated with it tend to diffuse through the sealing material and attack the metallic constituents of the seal coating. An inhibiting action that will prevent oxidation of the metallic particles and which will prevent oxidation of the oxides, for example cuprous oxide, can be obtained by adding copper nitrate and copper sulphate. A sealing glaze surface is produced in the sealing material at an operating temperature that is substantially lower than the melting point temperature for the glazing material. For example, if the glazing material is lithium fluoride, the melting point temperature of that material might be 1,100° to 1,200°. On the other hand, the glazing temperature of the sealing material might be as low as 700°. The glazing temperature can be lowered, however, by adding calcium fluoride so that a glaze surface might be obtained at about 600° or lower. Stannous oxide may be added to the material also to maintain the stability of the glazing material at operating temperatures that are close to the melting point temperature.

BRIEF DESCRIPTION OF THE INVENTION

A regenerator seal of the type shown in U.S. Pat. No. 3,746,352 is adapted to be used with a ceramic matrix material for a rotary regenerator wherein the matrix material is adapted for rotation about a fixed axis. The exhaust gases from the power section of the gas turbine engine pass through one segment of the rotating regenerator matrix and relatively cool high pressure intake air is passed through another segment thereof. As the regenerator matrix rotates, the exhaust gas heat that is absorbed by the matrix is transferred to the cooler higher pressure intake air thereby preheating the intake air which results in recovery of a substantial portion of the thermal energy of the engine exhaust gases to increase the efficiency of the engine. The presence of exhaust gas combustion products, which includes water vapor, the presence of free oxygen and the presence of high temperature creates a serious oxidation problem for the regenerator seal which reduces seal life and increases the coefficient of friction due to the breakdown of the lubricating film associated with the seal.

Figure 1:
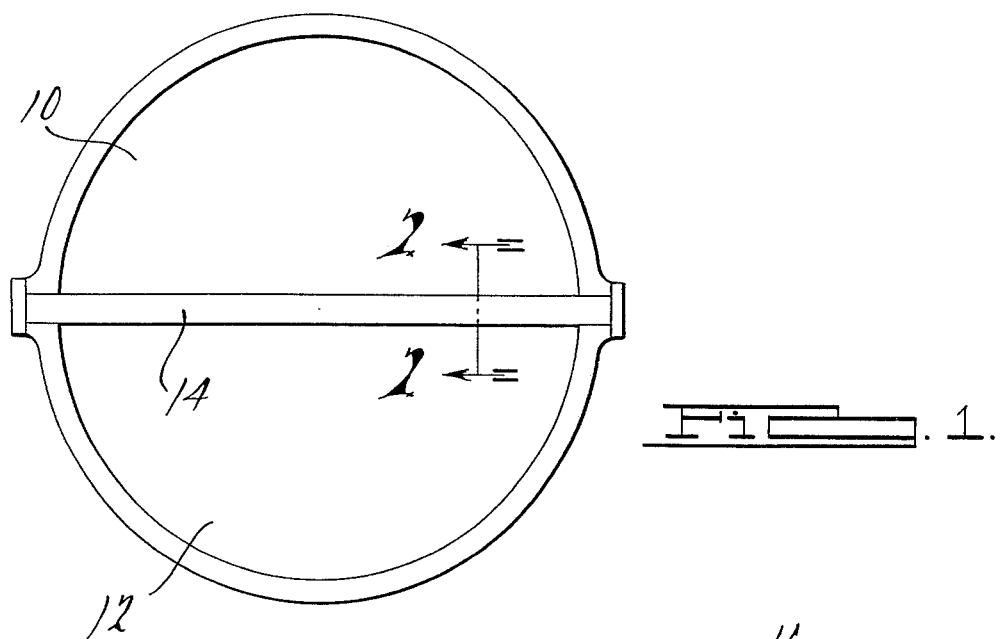
FIG. 1 shows a schematic plan view of a regenerator seal adapted to be used in a gas turbine regenerator.

In FIG. 1 the relatively cool high pressure intake air is ducted to a first regenerator region 10 and the hot exhaust gases are passed through another segment 12. A cross arm portion of the regenerator seal, which is shown at 14, separates the segments 10 and 12. The water vapor in the exhaust gases, as well as the free oxygen in the exhaust gases and in the intake air come in direct contact with the rubbing seal surface that engages the regenerator ceramic matrix. The improved coating of my invention will provide a lubricating glaze layer over the surface layer of the seal, and it will retard oxidation of metallic components in the surface layer.

Figure 2:
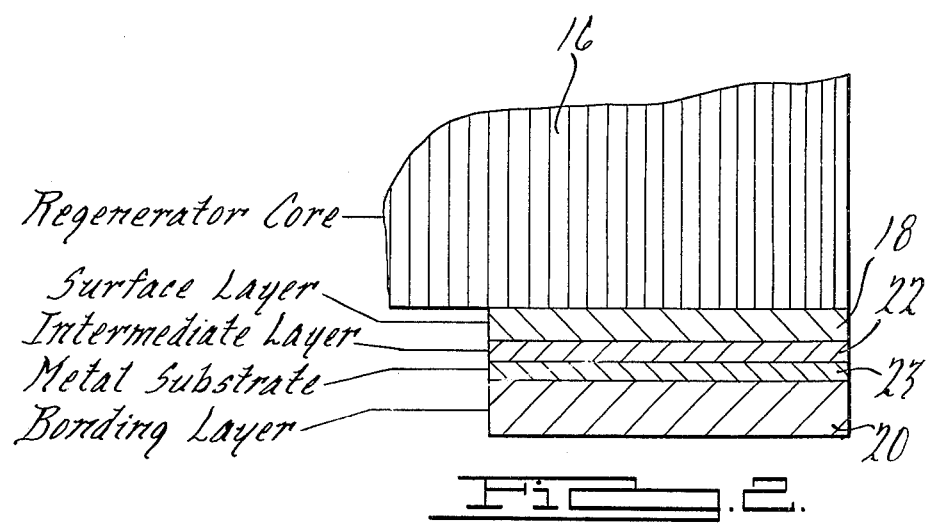
FIG. 2 shows a cross sectional view of a regenerator core and a portion of a cooperating seal as seen from the plane of section line 2—2 of FIG. 1.
Figure 3:
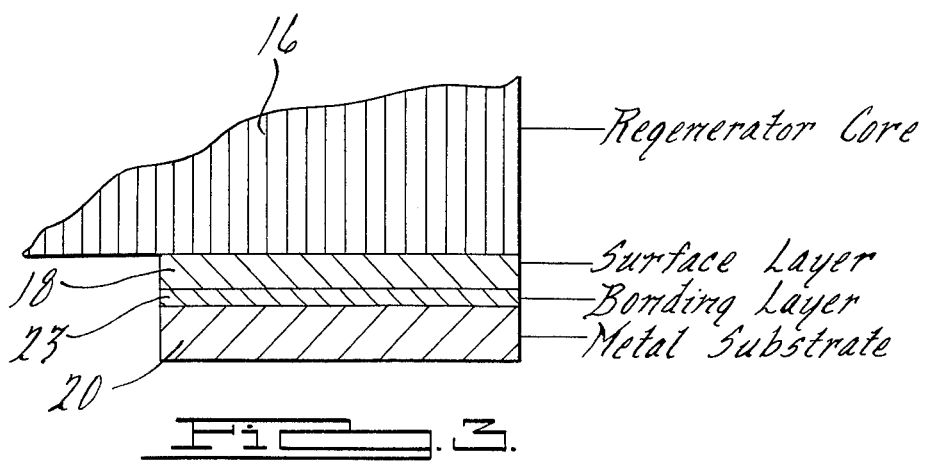
FIG. 3 is a cross sectional view taken along the plane of section line 2—2 of FIG. 1.

A regenerator core or matrix is shown in FIG. 2 at 16. The surface layer of the seal is shown at 18. It is bonded to a metal substrate 20 by means of an intermediate layer 22, the latter being bonded to the substrate 20 by a bonding layer 23. These various layers are described more particularly in U.S. Pat. No. 3,746,352.

The sealing surface layer for the seal structure, according to one embodiment of my invention, comprises a mixture that includes copper in powder form, sodium fluoride and lithium fluoride. The fluorides form a glazing surface as the seal operates in rubbing contact with the ceramic matrix at high temperatures.

Approximately 75 to 80 percent of the surface layer material is copper and cuprous oxide. To this mixture is added ½ to 3 percent of copper nitrate and copper sulphate. The copper sulphate and the copper nitrate may be used individually, but preferably they are mixed. They inhibit the oxidation of the copper to cuprous oxide and they inhibit the oxidation of the cuprous oxide to cupric oxide. Should such oxidation occur, the wear rate would increase due to the breakdown of the surface layer.

For every eighty parts of copper and cuprous oxide, approximately 9 parts of sodium fluoride and 11 parts of lithium fluoride are added. These percentages are used in order to provide a coefficient of thermal expansion for the surface layer that is as close as possible to the coefficient of thermal expansion of the substrate. In a preferred embodiment, the substrate is formed of stainless steel having a nickel-chrome content. The so-called intermediate layer shown in FIG. 2 at 22 protects the stainless steel from attack by the fluorides in the surface layer.

If the percentage of copper and cuprous oxide is reduced below 75 percent and the surface layer is added to the seal by a plasma spraying process, excess thermal expansion might occur because of the relatively high thermal expansion coefficient for the fluorides in comparison to the coefficient of thermal expansion of the copper constituents. On the other hand, if the percentage of copper and cuprous oxide should exceed 85 percent, the sodium fluoride and lithium fluoride, which constitute the glazing material will be incapable of establishing a durable glazing surface. If the surface layer should be formed by a sintering process in the form of a monolithic sealing block, the percentages of copper and cuprous oxide may be reduced below 75 percent, perhaps as low as 55 percent.

A second embodiment of my invention comprises 64 parts of nickel oxide, 16 parts calcium fluoride, 9 parts sodium fluoride and 11 parts lithium fluoride. As in the case of the first embodiment, ½ to 3 percent of copper nitrate and copper sulphate is added to this mixture to inhibit oxidation of the metal.

A third embodiment would comprise 48 parts of zinc oxide, 35 parts of calcium fluoride, 17 parts stannous oxide, 9 parts sodium fluoride and 11 parts of lithium fluoride. The stannous oxide helps to maintain stability of the zinc oxide at higher temperatures when the temperature of the surface rises above the glazing temperature to a value below the melting point temperature. The calcium fluoride in both the second and third embodiments lowers the glazing temperature to a value of approximately 600°F. Thus, glazing begins at a lower temperature and the glaze is maintained relatively stable by the presence of stannous oxide even at elevated temperatures. I also have successfully used an excess amount of zinc oxide in place of the stannous oxide; for example, the 17 parts stannous oxide in the third embodiment could be replaced with 17 parts zinc oxide so that the total zinc oxide content would be 65 parts per hundred.

It is important that the copper in the surface layer be of a size between −150 and +325 mesh, U.S. standard. The preoxidized copper in the surface layer should have a minimum oxygen content of 0.8 percent by weight and a maximum oxygen content of 1.2 percent by weight. The oxygen distribution in the preoxidized copper should be in the form of at least 80 percent cuprous oxide. The thickness of the surface layer for substrate shoes of 0.135 to 0.160 inch thickness should be between 0.008 and 0.5 inches. When these limits are maintained, the tendency for development of thermal stresses will not be as severe and bond failure will be prevented.

Coating materials are applied to the substrate by a plasma spraying process. In preparing the seal for the plasma spraying operation the surface to be coated must be completely clean and free from grease, ink marks, cavities or any foreign material. The stainless steel component that comprises the substrate, after it is formed by the die blank, should be stress relieved by heating it for a controlled length of time, perhaps one hour in a protected atmosphere. The substrate may be coned if this is desired by the use of a mechanical fixture.

The substrate to be coated should be cleaned using an abrasive wheel or emoery paper or the equivalent. In the alternative, the surface may be cleaned chemically by pickling or by electro-chemical etching means. The substrate should be washed with detergent to remove any foreign material or by rinsing with iso-propyl alcohol. This is necessary to remove ink marks. The substrate then can be degreased by a suitable degreaser or by using some other degreasing method. Immediately following the surface preparation step, the components should be grit blasted in a 20–50 mesh, nonfriable, hard ceramic grit. The grit blast pressure should be adjusted to prevent excessive distortion. The surface material then may be plasma sprayed.

The bond coating which may comprise a coarse powder of 80 percent nickel and 20 percent chrome alloy, should be applied to a thickness of about 0.004 inches minimum to 0.005 inches maximum. The intermediate coating should be applied with a plasma spraying operation to a thickness of about 0.012 to 0.015 inches.

A rubbing seal outer coating should be applied to the intermediate coating before the intermediate coating has had time to become contaminated or to absorb moisture. The plasma spray operation for applying the outer coating powder should continue until the coating thickness is a maximum of 0.050 to 0.055 inches. Preferably, a dry argon gas or dry nitrogen gas should be used in the plasma spraying operation. Gases containing hydrogen should not be used.

The seal surface then is ground in a dry condition using silicon carbide or alumina abrasive wheels to yield a surface finish of the desired smoothness. Following the grinding operation, the seal can be stress relieved by heating at about 800° for about 1 hour. This should be followed by air cooling.

Having thus described a preferred embodiment of my invention, what I claim and desire to secure by United States Letters Patent is:

1. A high temperature rubbing seal for use with a ceramic matrix of a gas turbine regenerator, said seal comprising a metallic substrate, a sealing surface layer and at least one intermediate layer between the surface layer and the substrate, said surface layer having a smooth outer sealing surface adapted to slidably engage the adjacent surface of the regenerator matrix, said surface layer being comprised of approximately 75 to 85 percent copper and cuprous oxide, 9 percent sodium fluoride, 11 percent lithium fluoride and copper nitrate.

2. A high temperature rubbing seal for use with a ceramic matrix of a gas turbine regenerator, said seal comprising a metallic substrate, a sealing surface layer and at least one intermediate layer between the surface layer and the metal substrate, said surface layer having a smooth outer sealing surface adapted to slidably engage the adjacent surface of the regenerator matrix, said surface layer being comprised of approximately 75 to 85 percent copper and cuprous oxide, 9 percent sodium fluoride, 11 percent lithium fluoride and copper sulphate.

3. A high temperature rubbing seal for use with a ceramic matrix of a gas turbine regenerator, said seal comprising a metallic substrate, a sealing surface layer and at least one intermediate layer between the surface layer and the metal substrate, said surface layer having a smooth outer sealing surface adapted to slidably engage the adjacent surface of the regenerator matrix, said surface layer being comprised of approximately 75 to 85 percent copper and cuprous oxide, 9 percent sodium fluoride, 11 percent lighium fluoride and a mixture of copper nitrate and copper sulphate.

4. A gas turbine regenerator seal for use with a rotary ceramic regenerator in a gas turbine engine, said seal comprising a metal substrate, a surface layer having a sealing surface adapted to sealingly engage in rubbing contact the adjacent surface of a rotary ceramic regenerator, at least one intermediate layer between the surface layer and the metal substrate and said surface layer comprising approximately 64 parts of nickel oxide, 16 parts calcium fluoride, 9 parts of sodium fluoride and 11 parts lithium fluoride, together with a measured amount of copper nitrate to inhibit oxidation of the nickel oxide.

5. A gas turbine regenerator seal for use with a rotary ceramic regenerator in a gas turbine engine, said seal comprising a metal substrate, a surface layer having a sealing surface adapted to sealingly engage in rubbing contact the adjacent surface of a rotary ceramic regenerator, at least one intermediate layer between the surface layer and the metal substrate and said surface layer comprising approximately: 64 parts of nickel oxide, 16 parts calcium fluoride, 9 parts of sodium fluoride and 11 parts lithium fluoride, together with a measured amount of copper sulphate to inhibit oxidation of the nickel oxide.

6. A gas turbine regenerator seal for use with a rotary ceramic regenerator in a gas turbine engine, said seal comprising a metal substrate, a surface layer having a sealing surface adapted to sealingly engage in rubbing contact the adjacent surface of a rotary ceramic regenerator, at least one intermediate layer between the surface layer and the metal substrate and said surface layer comprising approximately: 64 parts of nickel oxide, 16 parts calcium fluoride, 9 parts of sodium fluoride and 11 parts lithium fluoride, together with a mixture of copper nitrate and copper sulphate.

7. A high temperature rubbing seal for a gas turbine regenerator comprising a metal substrate, a surface layer, said surface layer having a sealing surface adapted to sealingly engage in rubbing contact the adjacent surface of a ceramic regenerator core, at least one intermediate layer between the surface layer and the metal substrate, said surface layer comprising approximately: 48 parts of zinc oxide, 35 parts of calcium fluoride, 17 parts of stannous oxide, 9 parts of sodium fluoride, and 11 parts of lithium fluoride, together with a measured amount of copper nitrate.

8. A high temperature rubbing seal for a gas turbine regenerator comprising a metal substrate, a surface layer, said surface layer having a sealing surface adapted to sealingly engage in rubbing contact the adjacent surface of a ceramic regenerator core, at least one intermediate layer between the surface layer and the metal substrate, said surface layer comprising approximately: 48 parts of zinc oxide, 35 parts of calcium fluoride, 17 parts of stannous oxide, 9 parts of sodium fluoride, and 11 parts of lithium fluoride, together with a measured amount of copper sulphate.

9. A high temperature rubbing seal for a gas turbine regenerator comprising a metal substrate, a surface layer, said surface layer having a sealing surface adapted to sealingly engage in rubbing contact the adjacent surface of a ceramic regenerator core, at least one intermediate layer between the surface layer and the metal substrate, said surface layer comprising approximately: 48 parts of zinc oxide, 35 parts of calcium fluoride, 17 parts of stannous oxide, 9 parts of sodium fluoride, and 11 parts lithium fluoride, together with a mixture of copper nitrate and copper sulphate.

10. A high temperature rubbing seal for a gas turbine regenerator comprising a metal substrate, a surface layer, said surface layer having a sealing surface adapted to sealingly engage in rubbing contact the adjacent surface of a ceramic regenerator core, at least one intermediate layer between the surface layer and the metal substrate, said surface layer comprising approximately: 65 parts of zinc oxide, 35 parts of calcium fluoride, 9 parts of sodium fluoride, and 11 parts of lithium fluoride, together with a measured amount of copper nitrate.

11. A high temperature rubbing seal for a gas turbine regenerator comprising a metal substrate, a surface layer having a sealing surface adapted to sealingly engage in rubbing contact the adjacent surface of a ceramic regenerator core, at least one intermediate layer between the surface layer and the metal substrate, said surface layer comprising approximately: 65 parts of zinc oxide, 35 parts of calcium fluoride, 9 parts of sodium fluoride, and 11 parts of lithium fluoride, together with a measured amount of copper sulphate.

12. A high temperature rubbing seal for a gas turbine regenerator comprising a metal substrate, a surface layer, said surface layer having a sealing surface adapted to sealingly engage in rubbing contact the adjacent surface of a ceramic regenerator core, at least one intermediate layer between the surface layer and the metal substrate, said surface layer comprising approximately: 65 parts of zinc oxide, 35 parts of calcium fluoride, 9 parts of sodium fluoride, and 11 parts of lithium fluoride, together with a mixture of copper nitrate and copper sulphate.

* * * * *

UNITED STATES PATENT OFFICE
CERTIFICATE OF CORRECTION

PATENT NO. : 3,887,201
DATED : June 3, 1975
INVENTOR(S) : V. Durga Nageswar Rao

It is certified that error appears in the above-identified patent and that said Letters Patent are hereby corrected as shown below:

In Figure 2 the label "Metal Substrate" and the label "Bonding Layer" should be changed so that the Bonding Layer is designated by numeral 23 and the Metal Substrate is designated by numeral 20.

Signed and Sealed this

Thirty-first Day of May 1977

[SEAL]

Attest:

RUTH C. MASON
*Attesting Officer*

C. MARSHALL DANN
*Commissioner of Patents and Trademarks*